(12) United States Patent
Nonaka et al.

(10) Patent No.: US 6,698,813 B2
(45) Date of Patent: Mar. 2, 2004

(54) VEHICLE-SEAT STORING STRUCTURE

(75) Inventors: Kenji Nonaka, Hiroshima (JP);
Keiichiro Shibata, Hiroshima (JP);
Yoshinobu Nishida, Hiroshima (JP);
Toshimine Morino, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/306,583

(22) Filed: Nov. 27, 2002

(65) Prior Publication Data

US 2003/0127880 A1 Jul. 10, 2003

(30) Foreign Application Priority Data

Nov. 29, 2001 (JP) .................................... P2001-364776

(51) Int. Cl.⁷ ................................................ B60N 2/50
(52) U.S. Cl. .................. 296/63; 296/65.01; 296/65.16; 296/70; 296/37.12; 180/90
(58) Field of Search .............................. 296/63, 65.01, 296/65.05, 65.09, 65.11, 65.16, 66, 70, 37.8, 37.12; 180/90

(56) References Cited

U.S. PATENT DOCUMENTS

| | | | | |
|---|---|---|---|---|
| 4,568,102 A | * | 2/1986 | Dauvergne | 296/70 |
| 5,509,710 A | * | 4/1996 | Eavenson et al. | 296/65.05 |
| 5,516,180 A | * | 5/1996 | Eavenson et al. | 296/65.05 |
| 6,382,694 B1 | * | 5/2002 | Rankin et al. | 296/55.16 |

FOREIGN PATENT DOCUMENTS

| | | |
|---|---|---|
| EP | 0 572 811 A1 | 5/1993 |
| EP | 0 626 290 A1 | 11/1994 |
| JP | 07186800 | 7/1995 |
| JP | 2000238560 | 5/2000 |
| WO | WO98/13230 * | 4/1998 ............... 296/70 |

* cited by examiner

Primary Examiner—Stephen T. Gordon
Assistant Examiner—Lori L Coletta
(74) Attorney, Agent, or Firm—Brooks Kushman P.C.

(57) ABSTRACT

The present invention provides a vehicle-seat storing structure having in combination an instrument panel disposed in the front end zone of a cabin space of a vehicle along the width direction of the vehicle, and a seat disposed opposed to the instrument panel. A concave portion is formed in the surface of the instrument panel opposed to the seat so as to receive therein at least a part of the seat in a seat position where a seat cushion is slidingly moved to a given position in the front end zone of the cabin space and a seatback is inclined frontwardly by a given angle. Further, the instrument panel defines an inside space having a given zone containing an air-conditioning unit for controllably adjusting cabin air and outside air to provide a desired cabin-air condition. The given zone is located approximately centrally in the width direction of the vehicle, and the concave portion is formed in a region of the instrument panel where it does not overlap the air-conditioning unit in the width direction of the vehicle.

7 Claims, 15 Drawing Sheets

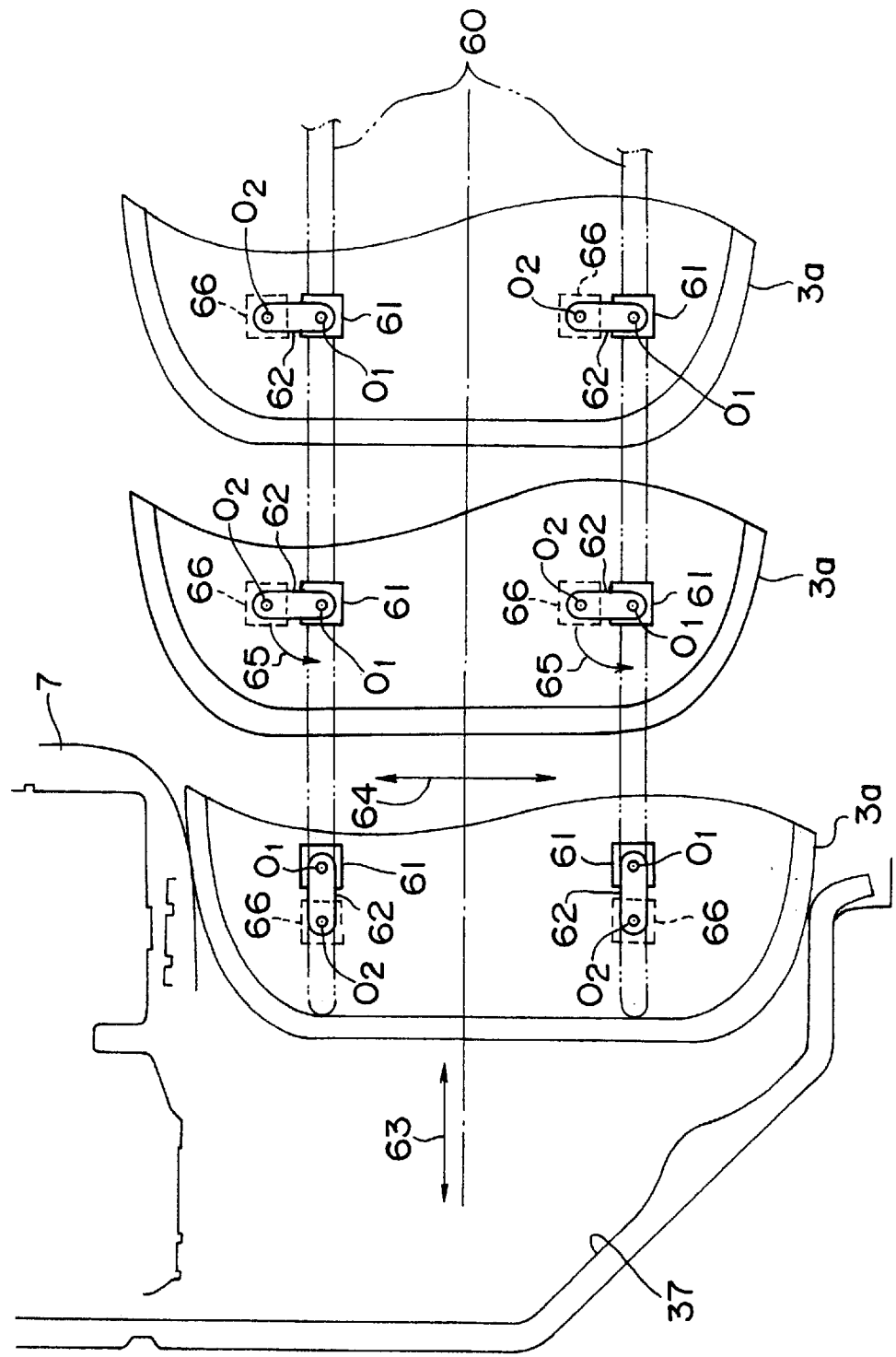

VEHICLE-SEAT STORING STRUCTURE

BACKGROUND OF THE INVENTION

1. Field of the Invention

The present invention relates to a vehicle-seat storing structure.

2. Description of the Prior Art

As is well known, in a small vehicle such as a 2-door or 3-door car, a passenger can get into a rear cabin space of the vehicle to sit on a rear passenger seat (assistant driver's seat) in a seat position where a seatback of a front passenger seat is frontwardly inclined (and the entire front passenger seat is frontwardly moved, if necessary). When the seat is in such a position, the frontwardly inclined seatback or a headrest attached to the upper end thereof can block the view from a driver seat, for example, such that a driver cannot check a sideview mirror on the side of the front passenger seat. Thus, in a seat arrangement having an inclinable/slidable or movable front passenger seat, it is desired to arrange the front passenger seat in a desirable position where a passenger can smoothly get into the rear cabin space to sit on the rear passenger seat without causing any blocking of the view from the driver seat.

In compliance with the demand for such a seat arrangement, there have been recently proposed various sheet arrangements for allowing front and/or rear passenger seats to be moved to and stored in a given position, so as to provide enhanced ride-comfort or space-utility even in a limited space such as a cabin space of a vehicle. For example, Japanese Patent Laid-Open Publication No. 2000-238560 discloses an automobile seat arrangement comprising: a first slide rail for longitudinally (i.e. frontwardly and rearwardly) moving a front passenger seat between a position where the front passenger seat is located below a dashboard and a regular position where the front passenger seat is located in parallel with a driver seat; a rear passenger seat divided into right and left seat bodies; and a second slide rail for longitudinally moving one of the seat bodies located just behind the front passenger seat, between a regular position and a longitudinally intermediate position lying between the other seat body and the driver seat. In this seat arrangement, the front passenger seat includes a seatback adapted to be frontwardly inclined and superimposed on a seating surface of the front passenger seat, wherein the front passenger seat can be stored in a space below the dashboard after the backseat is frontwardly inclined and a headrest is detached therefrom. In addition, according to this sear arrangement, a passenger can freely walk through the cabin space by positioning the rear seat body located just behind the front passenger seat approximately in the longitudinally intermediate position lying between the other seat body and the driver seat.

Generally, an instrument panel is provided in the front end zone of the cabin space to serve as a dashboard. The instrument panel defines an inside space for incorporating therein various components, such as an airbag or an air-conditioning unit including an evaporator and a heater core to controllably adjust cabin air and outside air so as to provide a given cabin-air condition, with arranging them in the width direction of the vehicle. Thus, if it is intended to provide a seat storing space in the instrument panel to store a seat in connection with the instrument panel, it is required to give consideration to the layout of the various components to be contained in the inside space of the instrument panel. In addition, it is desired to store the seat with good appearance.

SUMMARY OF THE INVENTION

It is an object of the present invention to provide a vehicle-seat storing structure capable of assuring a seat storing space without adverse affect on the component layout in the inside space of an instrument panel and of storing a seat with good appearance.

According to a first aspect of the present invention, there is provided a vehicle-seat storing structure having in combination an instrument panel disposed in the front end zone of a cabin space of a vehicle along the width direction of the vehicle, and a seat disposed opposed to the instrument panel. In this vehicle-seat storing structure, the seat comprises a seat cushion supported approximately horizontally and adapted to be slidably moved in the frontward and rearward directions of the vehicle, a seatback having a lower end pivotally coupled to the rear end of the seat cushion so as to be frontwardly inclined toward the seat cushion, and a headrest provided at the upper end of the seatback. Further, the instrument panel has a concave portion on the opposed side to the seat. The concave portion is adapted to receive therein at least a part of the seatback or the headrest in a seat position where the seat cushion is moved to a given position in the front end zone of the cabin space and the seatback is inclined frontwardly by a given angle.

The above vehicle-seat storing structure makes it possible to facilitate storing the seat with good appearance.

In a specific embodiment, the instrument panel defines an inside space having a given zone containing an air-conditioning unit for controllably adjusting cabin air and outside air to provide a desired cabin-air condition. In this case, the given zone may be located approximately centrally in the width direction of the vehicle, and the concave portion may be formed in a region of the instrument panel where the concave portion does not overlap the air-conditioning unit in the width direction of the vehicle.

This embodiment makes it possible to assure the seat storing space without adverse affect on the layout of the air-conditioning unit.

Further, the instrument panel is provided with an air outlet for discharging a conditioned air prepared by the air-conditioning unit into the cabin space, and the inside space of the instrument panel contains an air-conditioning duct for providing fluid communication between the air-conditioning unit and the air outlet to deliver the conditioned air. In this case, the air-conditioning duct may be formed to detour around the concave portion without causing interference therewith.

This makes it possible to assure the seat storing space without adverse affect on the layout of the air outlet and the air-conditioning duct in fluid communication therewith.

In another embodiment, the instrument panel may define therebelow a space for receiving therein the seat cushion in the seat position where the seat is stored in connection with the instrument panel.

According to this embodiment, the seat can be stored at a more frontward position to provide an increased cabin space behind the seat. Thus, the ride-comfort or space-utility of the cabin can be enhanced.

In still another embodiment, the concave portion may be formed such that a cabin-facing surface of the part of the seatback or the headrest received in the concave portion becomes approximately flush with the surface of the instrument panel around the cabin-facing surface, in the seat position where the seat is stored in connection with the instrument panel.

According to this embodiment, the seat can be stored with more enhanced appearance.

In yet another embodiment, the concave portion may have a surface formed in conformity to the peripheral surface of the part of the seatback or the headrest to be received in the concave portion.

This embodiment prevents excessive gap between the instrument panel and the part of the seat received in the concave portion. Thus, the seat can be stored with more enhanced appearance.

According to a second aspect of the present invention, there is provided a vehicle-seat storing structure having in combination an instrument panel disposed in the front end zone of a cabin space of a vehicle along the width direction of the vehicle, and a seat disposed opposed to the instrument panel. In this vehicle-seat storing structure, the seat comprises a seat cushion adapted to be slidably moved in the frontward and rearward directions of the vehicle and to be rotatably moved to a uprightly standing position opposed to the instrument panel, a seatback having a lower end pivotally coupled to the rear end of the seat cushion so as to be frontwardly inclined and superimposed on the seat cushion, and a headrest attached to the upper end of the seatback. Further, the instrument panel has a concave portion on the opposed side to the seat. The concave portion is adapted to receive therein at least a part of the seat in a seat position where the seat cushion is moved to the uprightly standing position with superposing the seatback thereon and is slid to its frontmost position.

This makes it possible to facilitate storing the seat with good appearance.

In a specific embodiment, the instrument panel defines an inside space having a given zone containing an air-conditioning unit for controllably adjusting cabin air and outside air to provide a desired cabin-air condition. In this case, the given zone may be located approximately centrally in the width direction of the vehicle, and the concave portion may be formed in a region of the instrument panel where the concave portion does not overlap the air-conditioning unit in the width direction of the vehicle.

This embodiment makes it possible to assure the seat storing space without adverse affect on the layout of the air-conditioning unit.

Further, the instrument panel is provided with an air outlet for discharging a conditioned air prepared by the air-conditioning unit into the cabin space, and the inside space of the instrument panel contains an air-conditioning duct for providing fluid communication between the air-conditioning unit and the air outlet to deliver the conditioned air. In this case, the air-conditioning duct may be formed to detour around the concave portion without causing interference therewith.

This makes it possible to assure the seat storing space without adverse affect on the layout of the air outlet and the air-conditioning duct in fluid communication therewith.

In the first and second aspect of the present invention, the seat may be a front passenger seat disposed in parallel with a driver seat on the front side of the cabin space, and a rear passenger seat may be provided behind the front passenger seat.

This can provide relatively wide cabin space in front of the rear passenger seat.

BRIEF DESCRIPTION OF THE DRAWINGS

FIG. 10 is an explanatory top plan view showing a guide mechanism (a slide rail and link mechanism) for moving a front passenger seat, in a seat storing structure according to a third embodiment of the present invention;

DETAILED DESCRIPTION OF THE PREFERRED EMBODIMENTS

The vehicle-seat storing structure according to the present invention is characterized in that an instrument panel disposed in the front end zone of a cabin space of a vehicle comprises a concave portion on the opposed side to a seat, said concave portion being adapted to receive therein at least a part of said seat so that the seat can be stored with good appearance, differently from the seat storing structure in which the seat is stored in a space below the dashboard after the backseat is frontwardly inclined and a headrest is detached therefrom, as disclosed in the forgoing Japanese Patent Laid-Open Publication No. 2000-238560.

With reference to the accompanying drawings, various embodiments of the present invention will now be described.

First Embodiment

Figure 1:
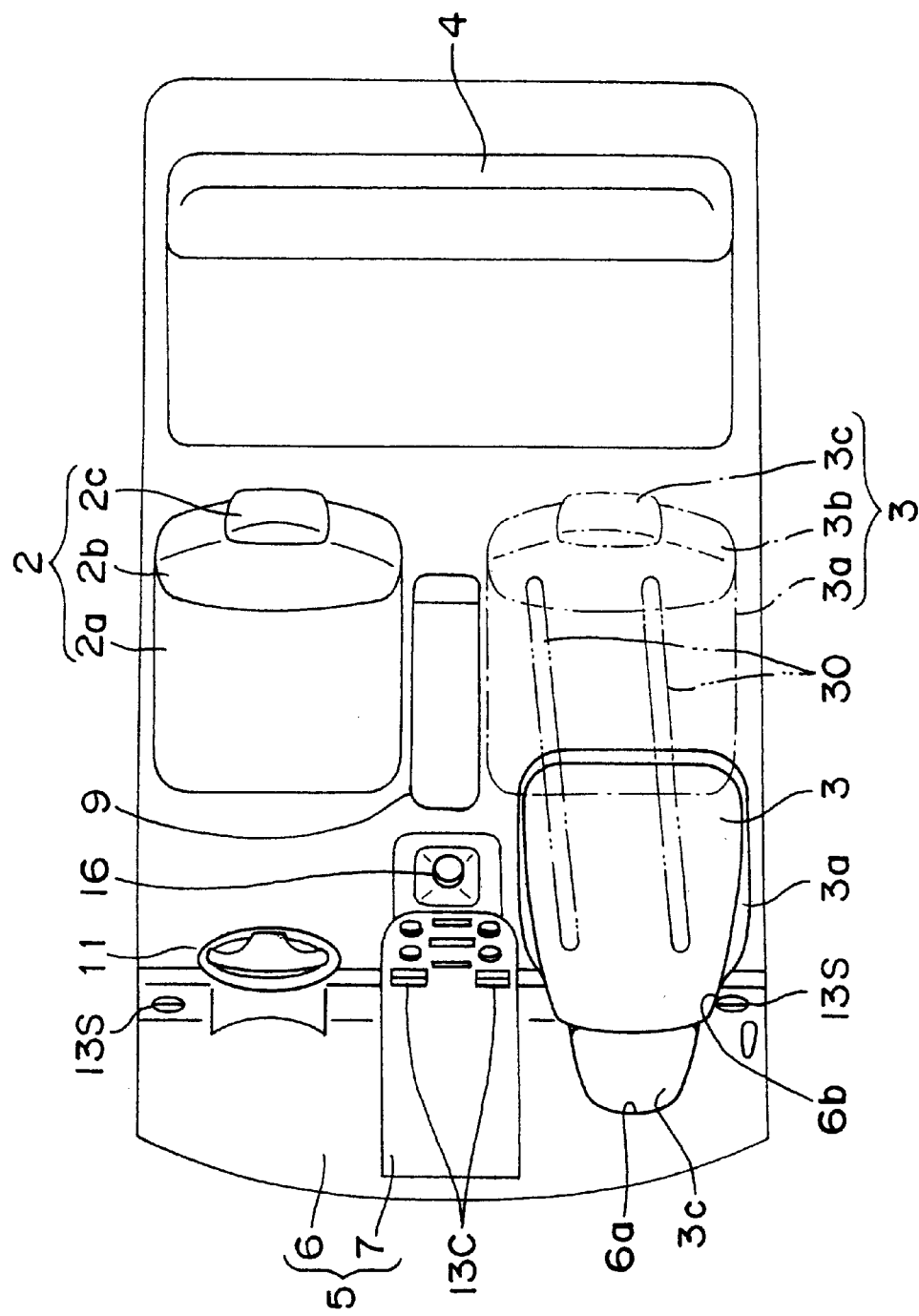
FIG. 1 is a schematic top plan view showing a cabin of a vehicle including a seat storing structure according to one embodiment of the present invention.

FIG. 1 is a schematic top plan view showing a cabin of a vehicle including a seat storing structure according to a first embodiment of the present invention. In FIG. 1, the left and right sides correspond to the front and rear sides of the vehicle, respectively. An instrument panel 5 is disposed in the front end zone of the cabin space along the width direction of the vehicle. The instrument panel 5 incorporates therein various components such as a steering wheel 11, an indicator panel 12 (see FIG. 2), central and side air-conditioning air outlets 13C and 13S, a control unit 14 (see FIG. 2), and a gearshift lever 16. A driver seat 2 and a front passenger seat 3 are disposed opposed to the instrument panel 5 and in parallel with one another with interposing a console box 9 therebetween. A rear passenger seat 4 is disposed on the rear side of or behind these seats 2 and 3 along the width direction of the vehicle.

The driver seat 2 includes a seat cushion 2a horizontally supported to define a seating surface, a seatback 2b having a lower end pivotally coupled to the rear end of the seat cushion 2a, and a headrest 2c attached to the upper end of the seatback 2b. As with the driver seat 2, the front passenger seat 3 includes a seat cushion 3a, a seatback 3b and a headrest 3c. In addition, the seatback 3a of the front passenger seat 3 is adapted to be frontwardly inclined toward the seat cushion 3a or its seating surface.

This vehicle may be a 2-door or 3-door type. After frontwardly moving and frontwardly inclining the front passenger seat 3, a passenger can get into a rear cabin space from a door on the side of the front passenger seat 3 to sit on the rear passenger seat 4. A pair of slide rails 30 are provided as a guide mechanism for moving the front passenger seat 3. The seat cushion 3a of the front passenger seat 3 is coupled to the slide rails 30 to allow the front passenger seat 3 to be slidably moved on the slide rails 30 in the frontward and rearward directions, i.e. longitudinal direction, of the vehicle.

In the first embodiment, when the front passenger seat 3 is moved to its frontmost position along the slide rails 30 and then frontwardly inclined, the front passenger seat 3 is stored in the front end zone of the cabin space or in a storage position where the seat cushion 3a is received in a space located below an instrument panel body 6, and the headrest 3c and the upper end of the seatback 3b are held at a given position. In FIG. 1, the solid line indicates the front passenger seat 3 stored in the front end zone of the cabin space, and the hypothetical-line (one-dot chain line) indicates the front passenger seat 3 in a passenger seating position where a passenger can sit thereon.

Figure 2:
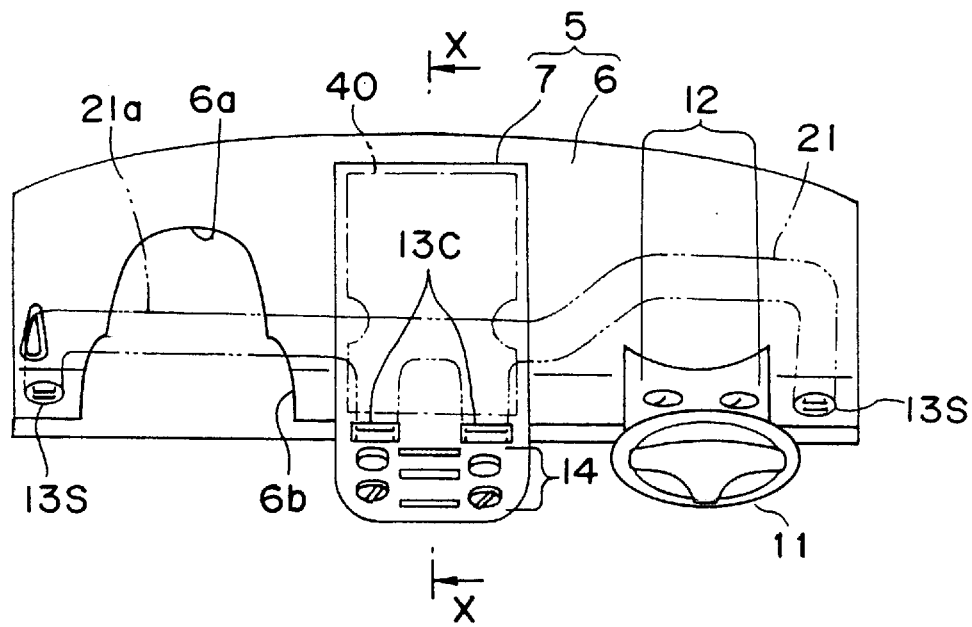
FIG. 2 is a top plan view showing an instrument panel.
Figure 3:
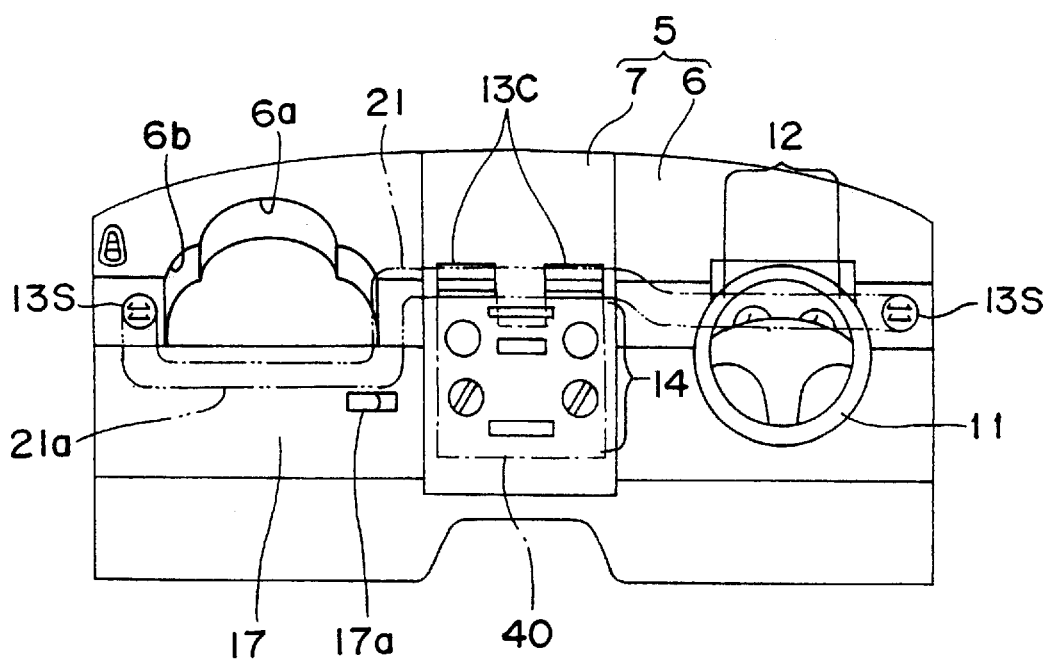
FIG. 3 is a front view showing the instrument panel.

The structure for storing the front passenger seat 3 will be described in detail below. FIGS. 2 and 3 are top plan and front views showing the instrument panel 5 disposed in the front end zone of the cabin space, respectively. The instrument panel 5 generally has an approximately T-shaped configuration formed by the instrument panel body 6 and a console 7 orthogonally intersecting to the instrument panel body 6 approximately at the center of the instrument panel 5 in the width direction of the vehicle, and the following various components are incorporated in the instrument panel body 6 and the console 7.

The steering wheel 11 is attached to the instrument panel body 6 to be opposed to the driver seat 2, and the indicator panel 12 including various indicators is incorporated in the instrument panel body 6. The outer or cabin-facing surface of the instrument panel body 6 is formed with seat-storing concave portions 6a, 6b correspondingly to the front passenger seat 3. The concave portions 6a, 6b will be described in detail later. A glove box 17 is provided below the concave portions 6a, 6b. A knob 17a is provided on the outer surface of the glove box 17, and a lid of the glove box 17 can be opened by pulling the knob 17b. The two side air outlets 13S are provided close to both right and left ends of the instrument panel body 6, respectively.

On the other hand, the two central air outlets 13C are provided in the console 7 in parallel with one another, and an audio/air-conditioning control unit 14 is incorporated in the console 7.

As described above, the concave portions 6a and 6b are provided on the outer surface of the instrument panel body 6 correspondingly to the front passenger seat 3. Specifically, the concave portions 6a and 6b are formed in the instrument panel body 6 to extend continuously from its upper surface and its opposed surface to the front passenger seat 3. When the front passenger seat 3 is moved on the slide rails 30 to its frontmost position and the seatback 3b is frontwardly inclined, the concave portions 6a and 6b can receive therein the headrest 3c and the upper end of the seatback 3b, respectively. The concave portion 6a has a surface formed in conformity to the peripheral surface of the headrest 3c when the headrest 3c has been received in the concave portion 6a. Similarly, the concave portion 6b has a surface formed in conformity to the peripheral surface of the seatback 3b when the seatback 3b has been received in the concave portion 6b. Further, the concave portions 6a and 6b are formed such that, when the headrest 3c and the upper end of the seatback 3b are received in the concave portions 6a and 6b, the respective cabin-facing surfaces of the headrest 3c and the seatback 3b become approximately flush with the surface of the instrument panel body 6 around the cabin-side surfaces.

While this embodiment includes the concave portions 6a and 6b for receiving the headrest 3c and the upper end of the seatback 3b, the present invention is not limited to such a structure, but may include only a concave portion for receiving the headrest.

In this embodiment, the internal layout of the instrument panel 5 is adjusted in conjunction with the concave portions 6a and 6b. More specifically, the instrument panel 5 defines an inside space containing an air-conditioning duct 21 (shown by two-dot chain line) for providing fluid communication between an air-conditioning unit 40 (shown by one-dot chain line) for controllably adjusting cabin air and outside air to provide a desired cabin-air condition, and the air outlets 13C, 13S to deliver a cool or hot air between the air-conditioning unit 40 and the air outlets 13C, 13S. The air-conditioning duct is curved downwardly in its region extending from the center of the inside apace in the width direction of the vehicle to the air outlet 13S provided close to one end of the instrument panel body 6 on the side of the front passenger seat 3, to detour around the concave portions 6a and 6b without causing interference therewith. The detour region is indicated by the reference numeral 21a.

The air-conditioning unit 40 is contained in a given zone of the inside space which is located approximately centrally in the width direction of the vehicle and defined by the console 7. Thus, the air-conditioning unit is disposed at a position where it does not overlap the concave portions 6a and 6b formed in the instrument panel body 6 correspondingly to the front passenger seat 3, in the width direction of the vehicle. This makes it possible to assure not only a sufficient inside space of the instrument panel body 6 on the side of the front passenger seat 3 to allow the concave portions 6a and 6b to be protrudingly formed thereby, but also a sufficient cabin space below the instrument panel body 6 to receive the seat cushion 3a therein.

Figure 4:
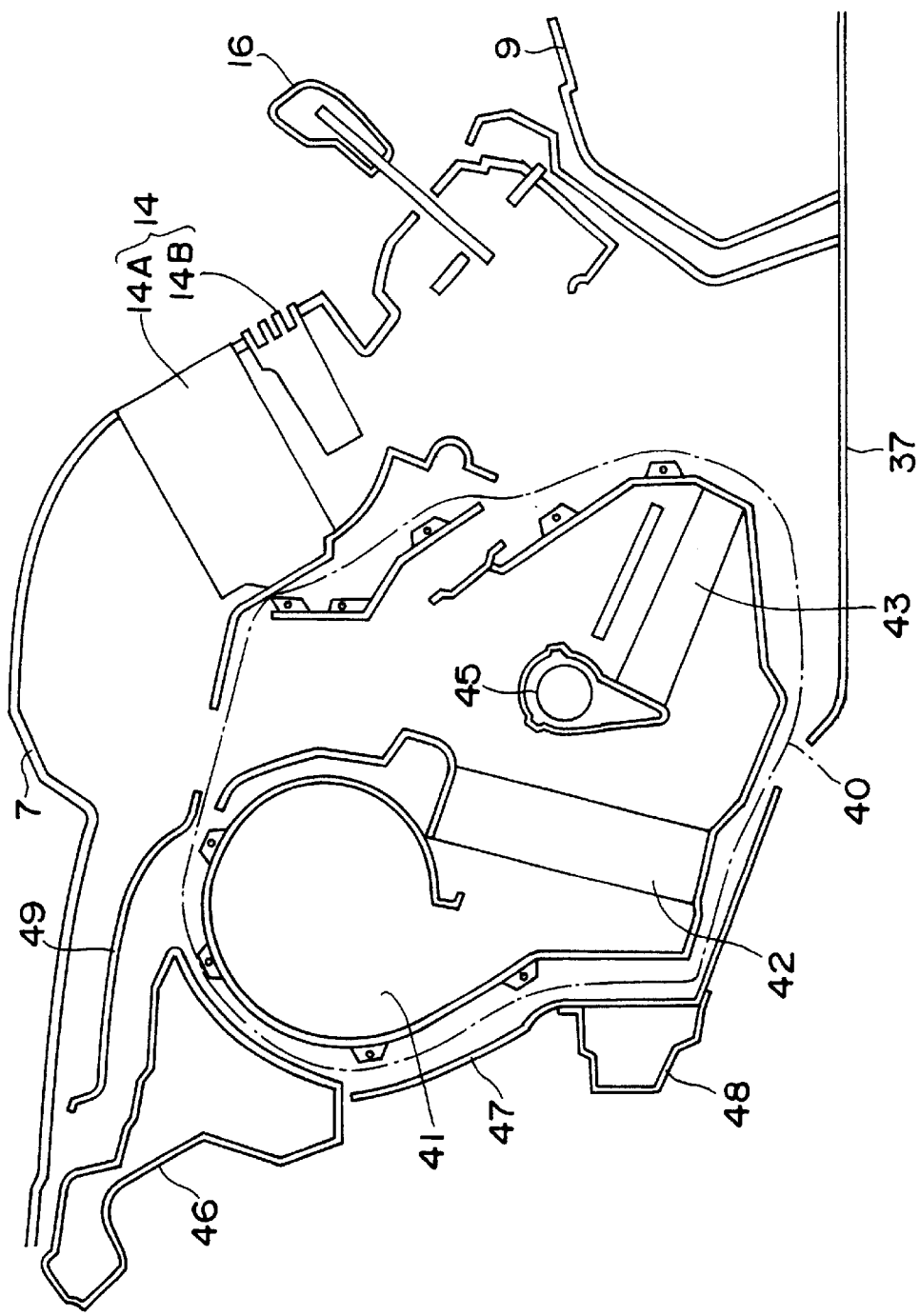
FIG. 4 is an explanatory sectional view taken along the line X—X in FIG. 2.

FIG. 4 is an explanatory vertical sectional view of the instrument panel 5 at the center in the width direction of the vehicle, taken along the line X—X in FIG. 2. As seen in this figure, the console 7 is provided with an audio controller 14A and an air-conditioning controller 14 B each having display and operation sections on the side of the cabin-facing or outer surface of the console 7 to make up as the control unit 14. Further, the gearshift lever 16 is disposed below the control unit 14.

In the inside space of the instrument panel 3, the air-conditioning unit 40 contained in the given zone defined by the console 7 includes a blower 41, an evaporator 42 and a heater core 43. The air-conditioning unit 40 generates cool or hot air, and then the generated cool or hot air is delivered through the air-conditioning duct 21 (see FIGS. 2 and 3). As a component passing through the given zone defined by the console 7, FIG. 4 shows a cross car beam 45 passing through the air conditioning unit 40, a cowl box 46, a dash panel 47 and a dash cross member 48. Each of these components has the same structure as that of conventional one.

In order to assure the strength of the instrument panel body 6, this embodiment includes a resin panel 49 provided in the width direction of the vehicle. FIG. 4 further shows a floor panel 37 on which a floor mat 39 (see FIG. 6) is provided in the cabin.

Figure 5A:
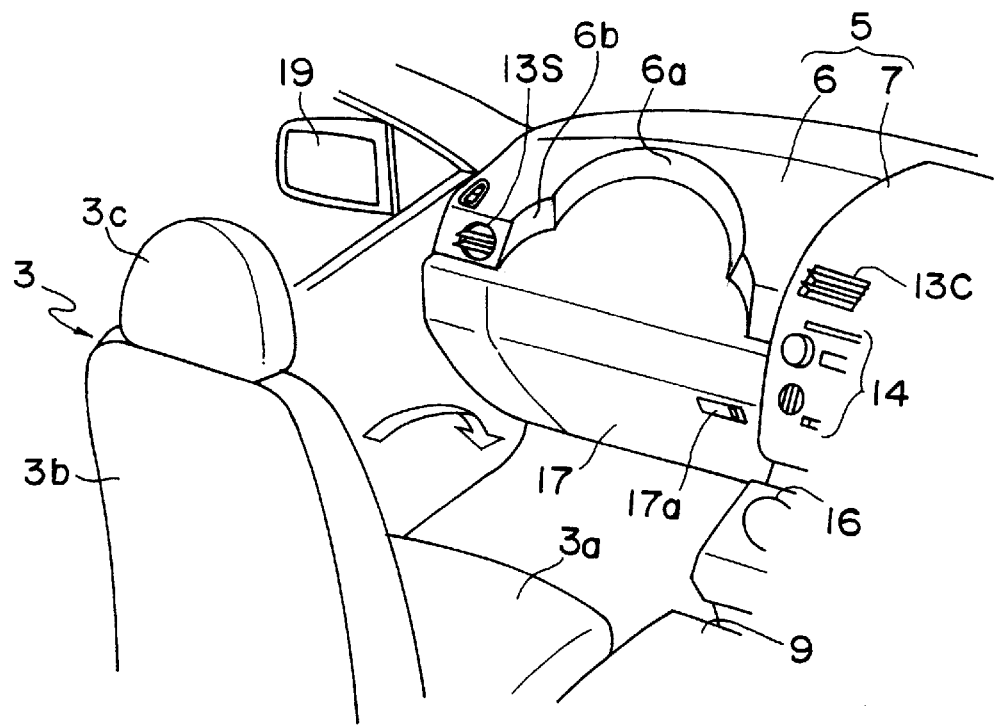
FIG. 5A is a perspective view showing a front passenger seat in a passenger seating position.
Figure 5B:
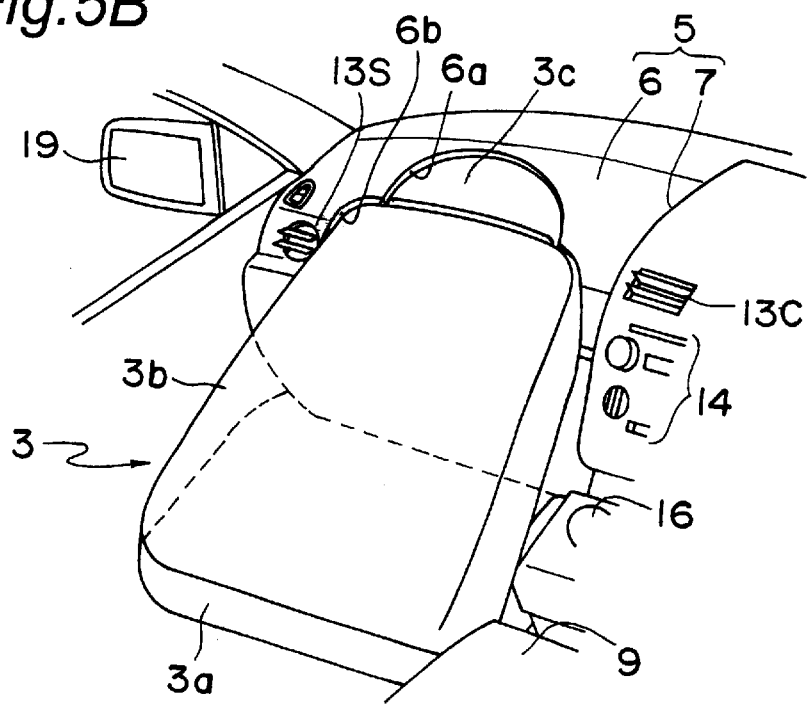
FIG. 5B is a perspective view showing the front passenger seat stored in connection with the instrument panel.

FIGS. 5A and 6B are perspective views showing the front passenger seat 3 in the passenger seating position and in the storage position, respectively. As seen in FIG. 5A, when the front passenger seat 3 is the passenger seating position, the seatback 3b of the front passenger seat 3 is held at a position where it approximately uprightly stands with respect to the seat cushion 3a. A sideview mirror 19 protruding outwardly in the width direction of the vehicle is attached to the frontward portion of the side window on the side of the front passenger seat 3.

On the other hand, in the storage position where the entire front passenger seat 3 is frontwardly moved and the seatback 3a is frontwardly inclined, the headrest 3c and the upper end of the seatback 3b of the front passenger seat 3 are received in the corresponding concave portions 6a and 6b formed in the instrument panel body 6, and the cabin-facing surfaces of the headrest 3c and the upper end of the seatback 3b become approximately flush with the surface of the instrument panel body 6 around the cabin-facing surfaces. Thus, the seat can be stored with good appearance. In this case, a desirable view field can be obtained without causing any blocking of the view of the sideview mirror 19 and others from the driver seat due to the frontwardly inclined front passenger seat 3.

Figure 6:
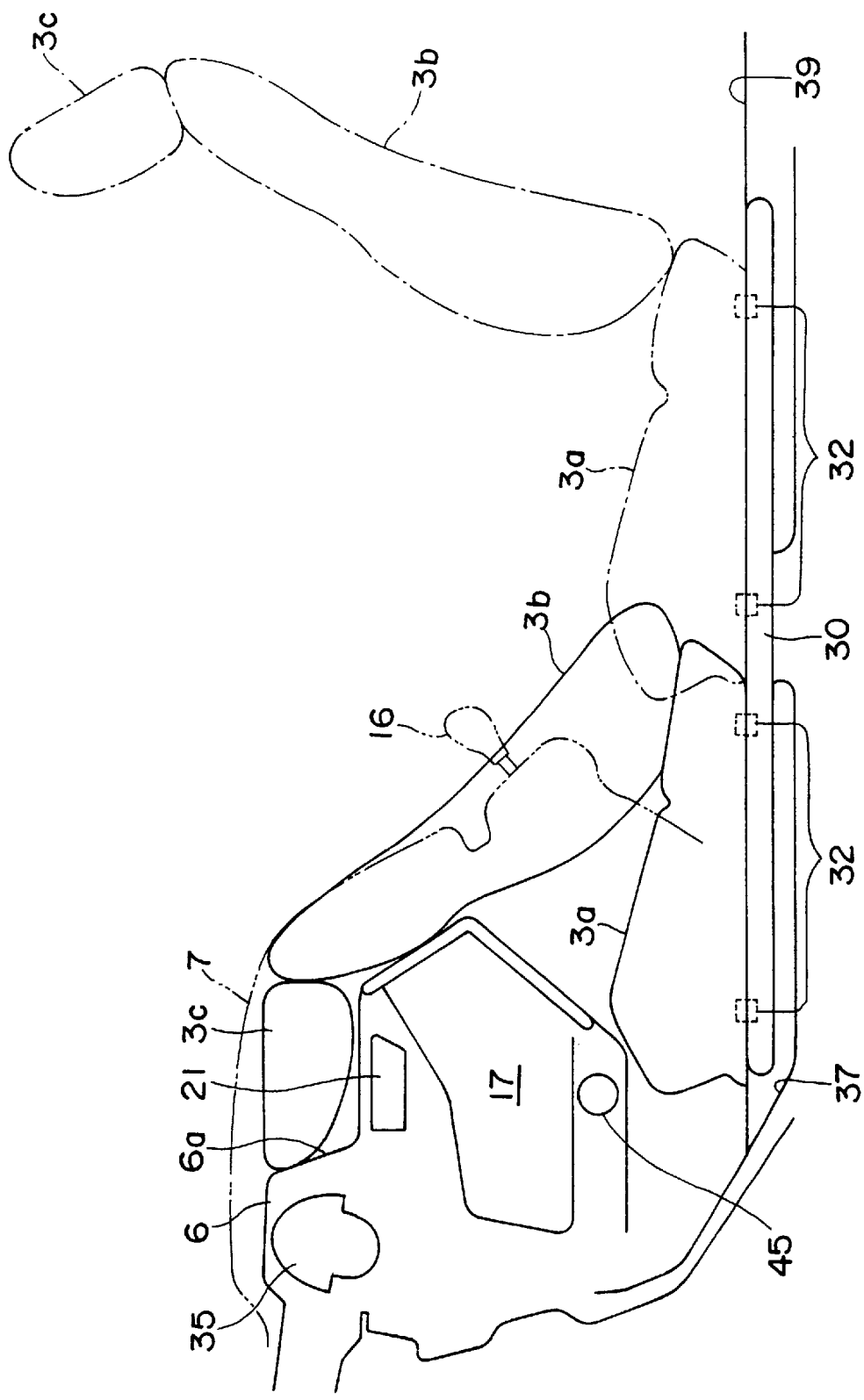
FIG. 6 is an explanatory side view of an operation for storing the front passenger seat in the front end zone of the cabin space.

FIG. 6 is an explanatory side view of an operation for storing the front passenger seat 3 in the front end zone of the cabin space. In FIG. 6, the front passenger seat 3 in the passenger seating position indicated by one-dot chain lines, and the front passenger seat 3 in storage position is indicated by solid lines. The seat-storing concave portions 6a and 6b (the concave portion 6b is not shown herein) are formed in the cabin-facing or outer surface of the instrument panel body 6 correspondingly to the front passenger seat 3, and the glove box 17 is provided below the concave portions 6a and 6b. An airbag 35 is incorporated in the inside space of the instrument panel body 6 and in front of the concave portions 6a and 6b, and the air-conditioning duct 21 passes through the inside apace below the concave portions 6a and 6b.

As described above, the slide rails 30 are provided as a guide mechanism for moving the front passenger seat 3. Each of the slide rails 30 has an upper surface designed to be approximately flush with the upper surface of the floor mat 39 provided on the floor panel 37. The front passenger seat 3 is coupled to the slide rails 30 through a plurality of sliders 32 (four sliders in this embodiment). Each of the sliders 32 is attached slidably to the corresponding slide rail 30, and respective one ends of the sliders are fixed to the back surface of the seat cushion 3a. Thus, as the front passenger seat 3 is moved on the slide rails 30, the seat cushion 3a can be moved in the frontward and rearward direction, i.e. longitudinal direction, of the vehicle.

The slider 32 has, but not shown, a structure for locking the slider at a given position in the longitudinal direction of the slide rail 30. In FIG. 6, when the front passenger seat 3 is in the passenger seating position (one-dot chain lines) and in the storage position (solid lines), the slider 32 is locked with respect to the slide rail 30.

In the seat storing operation for storing the front passenger seat 3 in the front end zone of the cabin space in a given posture or the storage position, the seat cushion 3a is first moved on the slide rails 30 to its front most position and inserted into the space below the instrument panel body 6. Then, the seatback is frontwardly inclined to insert the headrest 3c and the upper end of the seatback 3b into the corresponding concave portions 6a and 6b to complete the seat storing operation. As clearly seen in FIG. 6, the cabin-facing surfaces of the headrest 3c and the upper end of the seatback 3b become approximately flush with the surface of the instrument panel body 6 around the cabin-facing surfaces. Thus, the front passenger seat 3 can be stored with good appearance.

Figure 7:
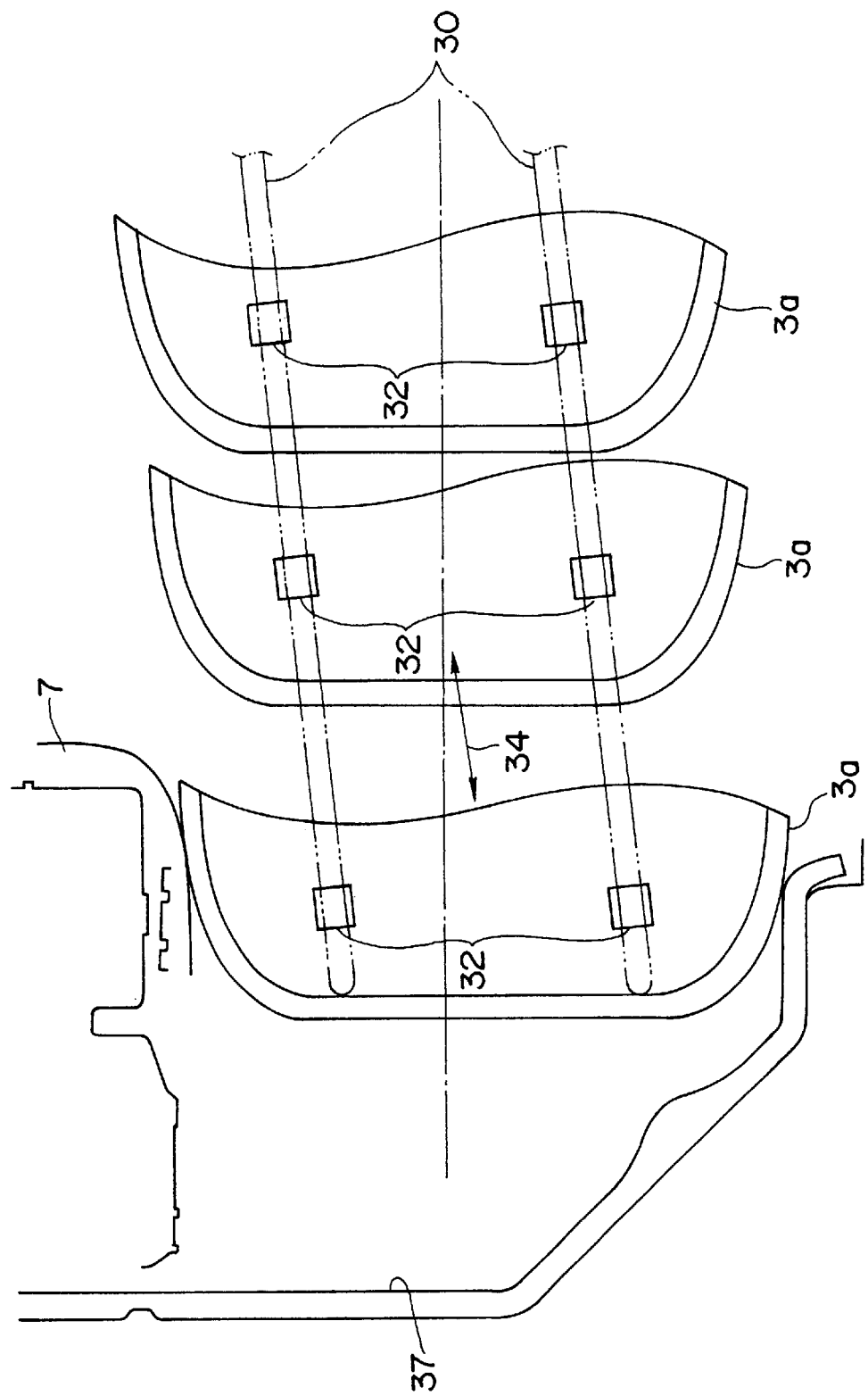
FIG. 7 is an explanatory view showing the state when the front passenger seat is moved on a slide rail toward the front end zone of the cabin space.

FIG. 7 is an explanatory view showing the state when the seat cushion 3a of the front passenger seat 3 is moved on the slide rails 30 toward the front end zone of the cabin space. As clearly seen in FIG. 7, when the seat cushion 3a is in the passenger seating position (the right-side in the figure), the side portion of the seat cushion 3a overlaps the console 7 located approximately centrally in the width direction of the vehicle. Therefore, if the seat cushion 3a is frontwardly moved simply along the longitudinal direction of the vehicle, it will interfere with the console 7 to restrict the frontward movement of the seat cushion 3a.

This embodiment includes a measurement for solving this problem, in which the front end (left end in FIG. 7) of each of the pair of slide rails is positioned more outwardly (lower side in FIG. 7) than its rear end in the longitudinal direction of the vehicle so that each of the slide rails has an oblique angle with respect to the longitudinal direction of the vehicle. According to this arrangement of the slide rails 30, the front passenger seat 3 is moved in an oblique direction (the arrow 34) with respect to the longitudinal direction of the vehicle, and shifted outwardly in the longitudinal direction of the vehicle as moving toward the front end zone of the cabin space. During this movement, the orientation of the seat cushion 3a is kept constant. When the seat cushion is in the frontmost position of the slide rails 30 or the front passenger seat 3 is stored in the front end zone of the cabin space, the front portion of the seat cushion 3a is received in a space between the console 7 and the sidewall surface of the floor panel 37 or is located more frontwardly than the rear end of the console 7.

According to this arrangement of the slide rails 30, in the seat storing operation, the seat cushion 3a can be moved to a more frontward position without causing interference with the console 7 extending with a given width in the center of the instrument panel 5. This also makes it possible to assure a lager space behind the front passenger seat 3 (the frontward side of the rear seat 4) so as to provide enhanced ride-comfort or space-utility.

As seen in the above description, in the first embodiment, the front passenger seat 3 is moved toward the front end zone of the cabin space, and then frontwardly reclined to insert a part of the front passenger seat 3 (the headrest 3c and the upper end of the seatback 3b in this embodiment) into the concave portions 6a and 6b formed in the instrument panel 6, with the cabin-facing surface of the part of the front passenger seat 3 approximately flush with the surface of the instrument panel body 6 therearound. Thus, the front passenger seat 3 can be readily stored in the front end zone of the cabin space with good appearance and without causing any blocking of the view from the driver seat.

In addition, the air-conditioning unit 40 is positioned such that it does not overlap the concave portions 6a and 6c in the width direction of the vehicle, and thereby the inside space of the instrument panel body 6 on the opposed side to the front passenger seat 3 can be assured to adequately form the concave portions 6a and 6b. In this case, corresponding to the concave portions 6a and 6b the air-conditioning duct 21 can be adjustable formed to extend in the inside space of the instrument panel 5 in the width direction of the vehicle toward the air outlet 13 S provided close to the end of the instrument panel body 6 while curvedly detouring around the concave portions 6a and 6b without causing interference therewith.

Further, in the first embodiment, the slide rails 30 for moving thereon the seat cushion 3a are arranged to have a given oblique angle with respect to the longitudinal direction of the vehicle. Thus, the seat cushion 3a can be moved to a more frontward position with adequately maintained size of the console 7 and without causing interference with the console 7. As best seen in FIG. 1, when the front passenger seat 3 is stored in the front end zone of the cabin space, this arrangement makes it possible to assure a wider space in front of the rear seat 4 to provide enhanced ride-comfort or space-utility. Additionally, a passenger can smoothly get into the rear cabin space from the door on the side of the front passenger seat 3 to sit on the rear seat by storing the front passenger seat 3 in the front end zone of the cabin space.

Another embodiment will be described below. In the following description, the same elements or components as those in the first embodiment are defined by the same reference numerals, and their description will be omitted.

Second Embodiment

Figure 8:
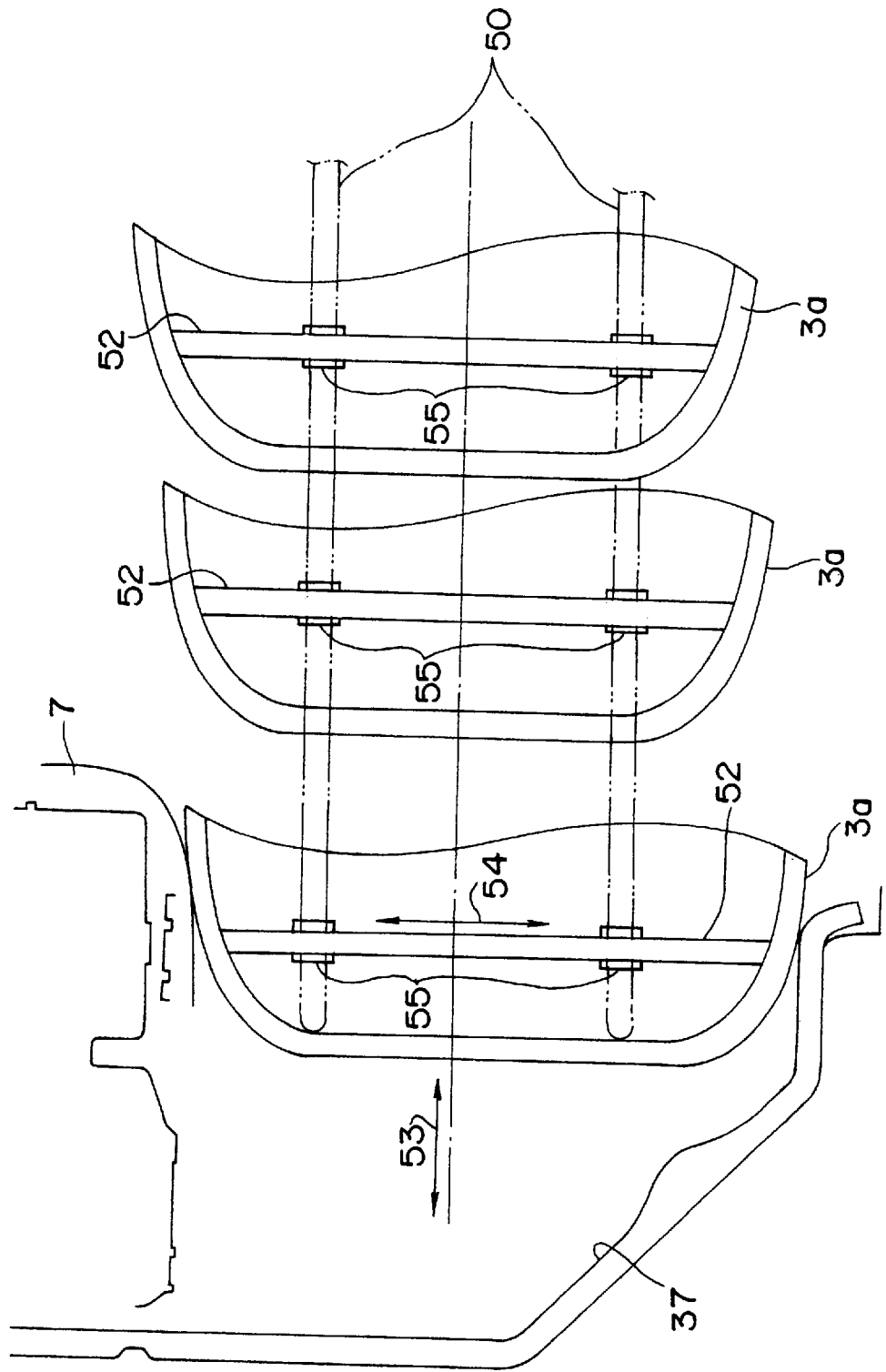
FIG. 8 is a top plan view showing a slide rail serving as a guide mechanism for moving a front passenger seat, in a seat storing structure according to a second embodiment of the present invention.

A second embodiment of the present invention employs a seat-moving guide mechanism, which is different from that in the first embodiment, for shifting a front passenger seat in the width direction of a vehicle as moving it in the frontward and rearward directions, i.e. longitudinal direction, of the vehicle. FIG. 8 is a top plan view of the guide mechanism for moving the front passenger seat, in a seat storing structure according to the second embodiment of the present invention. In the second embodiment, the guide mechanism for moving the front passenger seat 3 includes a pair of slide rails 50 for the movement in the longitudinal direction of the vehicle, and the slide rails 50 are disposed along the longitudinal direction (indicated by one-dot chain lines) of the vehicle. Each of the slide rails 50 has an upper surface designed to be approximately flush with the upper surface of the floor mat 39 provided on the floor panel 37.

The guide mechanism further includes a pair of slide rails 52 for the movement in the width direction of the vehicle, and the slide rails 52 are fixed to the back surface of the seat cushion 3a. In each of the seat cushions 3a illustrated in FIG. 8, only the front-side slide rail 52 is shown. The slide rail 52 is arranged to intersect orthogonally to the slide rails 50 in top plan view and extend in the width direction of the vehicle.

These slide rails 50 and 52 are coupled with each other through a plurality of sliders 55. In the second embodiment, one pair of the sliders 55 are disposed on each of the front and rear sides of the back surface of the seat cushion 3a, but FIG. 8 shows only the front pair.

Each of the sliders 55 is slidably attached to the corresponding slide rails 50 and 52. The sliders 55 is moved along the slide rails 50 to move the seat cushion 3a in the longitudinal direction (shown by the reference numeral 53) of the vehicle. At the same time, the sliders 55 is moved along the slide rails 52 to move the seat cushion 3a in the width direction (shown by the reference numeral 54) of the vehicle. Thus, the front passenger seat 3 can be shifted outwardly in the width direction of the vehicle as it is moved toward the front end zone of the cabin space.

The above guide mechanism for moving the front passenger seat 3 makes it possible to move the front passenger seat 3 to a more frontward position without causing interference with the console 7 located in the center of the instrument panel 5, so as to achieve an enhanced seat-storing performance. Thus, when the front passenger seat 3 is stored in the front end zone of the cabin space, a wider space can be assured in front of the rear seat 4 to provide enhanced ride-comfort or space-utility.

Figure 9:
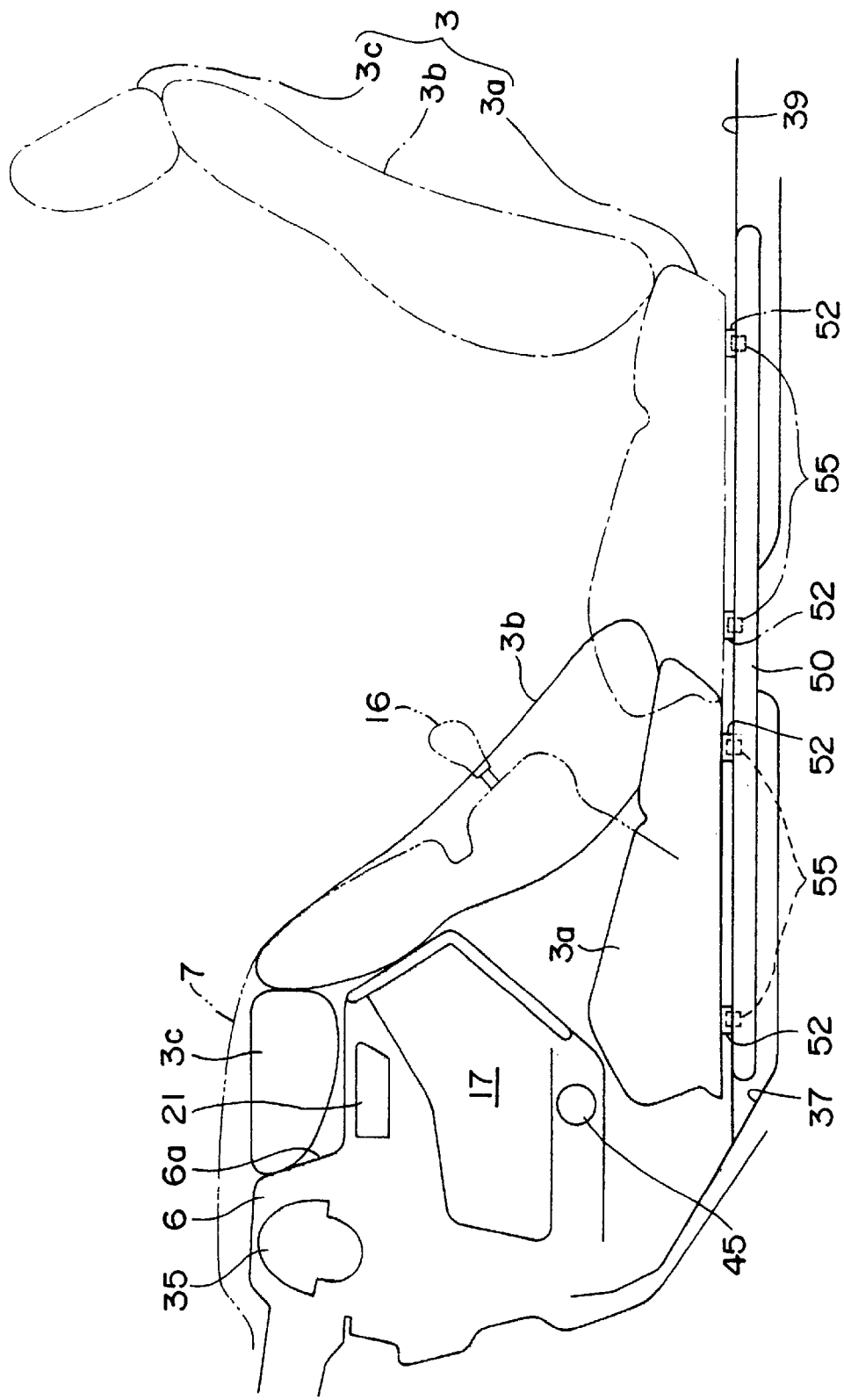
FIG. 9 is an explanatory side view of an operation for storing the front passenger seat in the front end zone of the cabin space, in the seat storing structure according to the second embodiment.

FIG. 9 is an explanatory side view of an operation for storing the front passenger seat 3 in the front end zone of the cabin space. In this figure, the front passenger seat 3 in the passenger seating position is indicated by one-dot chain lines, and the front passenger seat 3 stored in the front end zone of the cabin space is indicated by solid lines, as with FIG. 6. In the seat storing operation for storing the front passenger seat 3 in the front end zone of the cabin space in a given posture, the seat cushion 3a is first moved outwardly in the width direction (a direction perpendicular to the sheet of FIG. 9) through the slide rails 52 while moving the seat cushion 3a to its frontmost position on the slide rails 52, and inserted into the space below the instrument panel body 6. Then, the seatback 3b is forwardly inclined to insert the headrest 3c and the upper end of the seatback 3b into the corresponding concave portions 6a and 6b (the concave portion 6b is not shown herein) to complete the seat storing operation. In the second embodiment, the cabin-facing surfaces of the headrest 3c and the upper end of the seatback 3b can also become approximately flush with the surface of the instrument panel body 6 around the cabin-facing surfaces to achieve a seat-storing performance capable of providing good appearance.

Third Embodiment

A third embodiment of the present invention employs a seat-moving guide mechanism, which is different from that in the first and second embodiments, for shifting a front passenger seat in the width direction of a vehicle as moving it in the frontward and rearward directions, i.e. longitudinal direction, of the vehicle. FIG. 10 is an explanatory top plan view of the guide mechanism for moving the front passenger seat, in a seat storing structure according to the third embodiment of the present invention. The guide mechanism for moving the front passenger seat 3 includes a pair of slide rails 60 for the movement in the longitudinal direction of the vehicle, and the slide rails 60 are disposed along the longitudinal direction of the vehicle, as with the slide rails 50 in the second embodiment. The slide rails 60 are provided with a plurality of sliders 61 slidably attached thereto.

In the third embodiment, the guide mechanism further includes a plurality of link members 62 each having a given length and one end which is pivotally coupled to the corresponding slider 61 to allow each of the link member to be swingably moved about a pivot $O_1$ in a horizontal plane. Brackets 66 of the same number as that of the link members 62 are fixed to the back surface of the seat cushion 3a, and the other end of each of the link members 62 is pivotally coupled to the corresponding bracket 66 to allow each of the link member 62 to be swingably moved about a pivot $O_2$ in a horizontal plane. As above, the seat cushion 3a is coupled to the slide rails 60 through a plurality of link mechanisms each composed of the slider 61, the link member 62 and the bracket 66.

In the third embodiment, one pair of the link mechanisms each composed of the slider 61, the link member 62 and the bracket 66 are disposed on each of the front and rear sides of the back surface of the seat cushion 3a, but FIG. 10 shows only the front pair.

The seat movement according to the above link mechanism will be described below. The link member 62 is adapted to extend along the width direction of the vehicle when the seat cushion 3a is in the passenger seating position. That is, in the passenger seating position, the end of the link member 62 pivotally coupled to the bracket 66 or to be swingably moved about the pivot $O_1$ with respect to the slide rail 60 is located on the inward side of the vehicle.

Figure 11A:
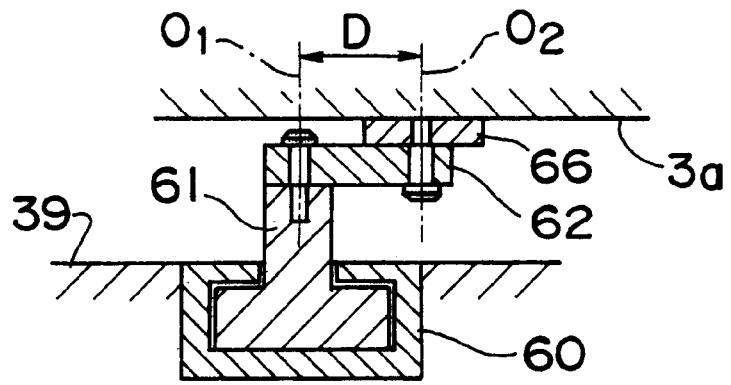
FIG. 11A is a schematic sectional view showing a link mechanism for moving the front passenger seat in the width direction of the vehicle, in a pre-operation position.
Figure 11B:
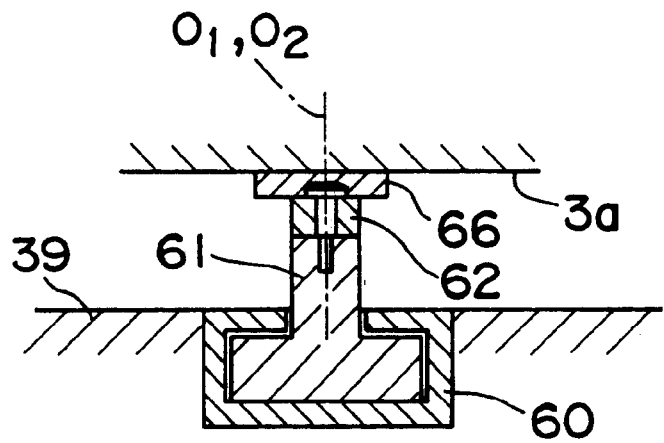
FIG. 11B is a schematic sectional view showing the link mechanism for moving the front passenger seat in the width direction of the vehicle, in a post-operation position.

In the course of the operation for storing the front passenger seat 3 in the front end zone of the cabin space, the link member 62 is swung at 90-degree from one position where the end of the link member 62 faces to the inward side of the vehicle to another position where it faces to the frontward side of the vehicle, in the direction as shown by the arrow 65. Finally, the link member 62 is positioned to extend along the longitudinal direction of the slide rail 60. Based on the movement (swing movement of the link members) of this link mechanism, the seat cushion 3a is moved outwardly in the width direction of the vehicle. Thus, the front passenger seat 3 can be shifted outwardly in the width direction of the vehicle as it is moved toward in the front end zone of the cabin space. In this manner, FIGS. 11A and 11B show the link mechanism for moving the front passenger seat 3a in the width direction of the vehicle in pre-operation and post-operation positions, respectively. FIG. 11 shows the link mechanism viewing from the rear side of the vehicle. The slide rail 60 herein is designed to be approximately flush with the upper surface of the floor mat 39. One end of the link member 62 is pivotally coupled to the slider 61 slidably attached to the slide rail 60 to allow the link member 62 to be swingably moved about the pivot $O_1$. The other end of the link member 62 is pivotally coupled to the bracket 66 fixed to the back surface of the seat cushion 3a, so that the link member 62 is swingably moved about the pivot $O_2$. The pivots $O_1$ and $O_2$ are spaced apart from one another with leaving a distance D therebetween.

In the operation for storing the front passenger seat 3, when the link member 62 is swung about the pivot $O_1$ at 90-degree from one position where the end of the link member 62 faces to the inward side of the vehicle to another position where it faces to the frontward side of the vehicle, the pivots $O_1$ and $O_2$ are aligned with one another along the longitudinal direction of the vehicle. As a result of the swing movement of the link member 62, the pivot $O_2$ is moved in the width direction of the vehicle by the distance D. Based on the swing movement of the link member 62, the seat cushion 3a is moved in the width direction of the vehicle. Thus, the front passenger seat 3 can be shifted outwardly in the width direction of the vehicle by the distance D.

According to the above guide mechanism for moving the front passenger seat 3, the front passenger seat 3 can be moved to a more frontward position without causing interference with the console 7 located approximately in the center of the instrument panel to achieve a desired seat-storing performance. Thus, when the front passenger seat 3 is stored in the front end zone of the cabin space, a lager space can be assured in front of the rear seat 4 to provide enhanced ride-comfort or space-utility.

Fourth Embodiment

Figure 12:
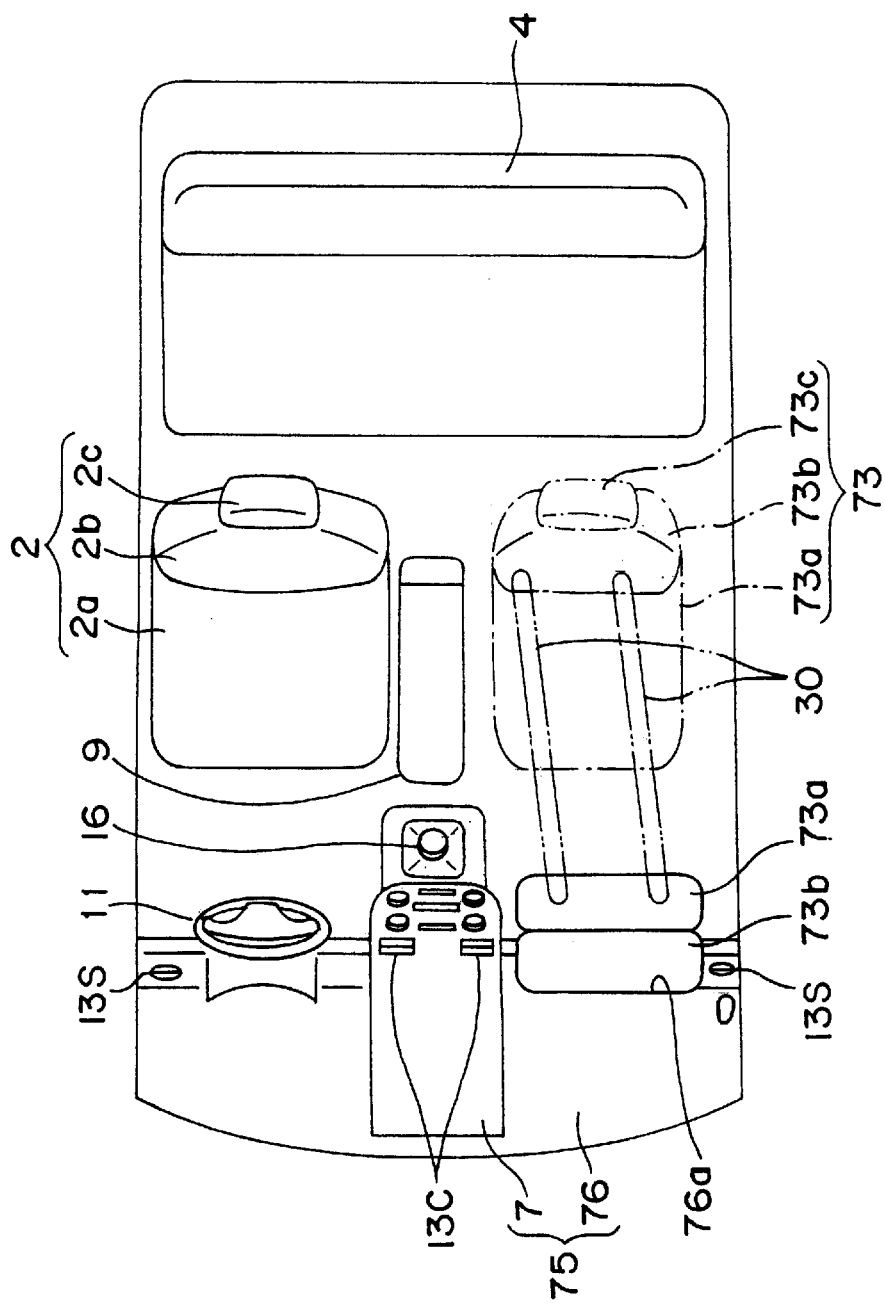
FIG. 12 is an explanatory top plan view of an operation for storing a front passenger seat in the front end zone of the cabin space, in a seat storing structure according to a fourth embodiment of the present invention.
Figure 13:
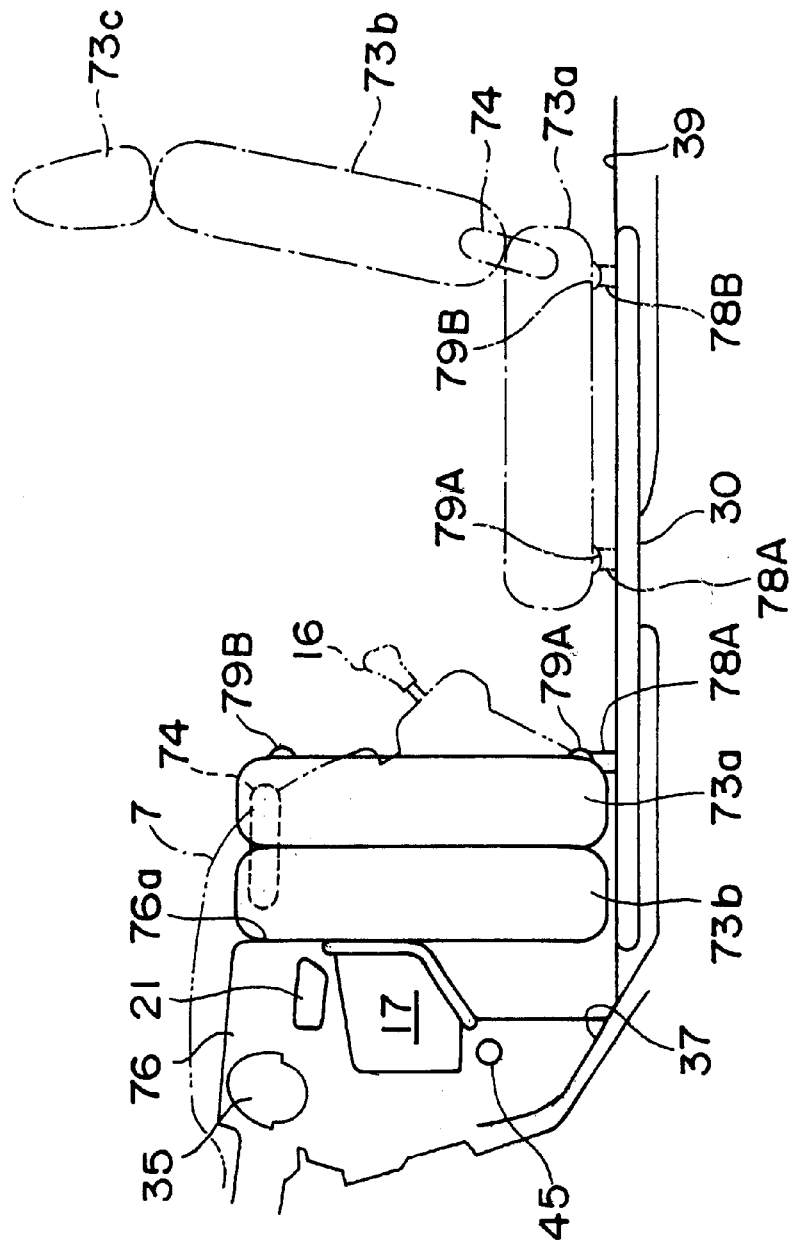
FIG. 13 is an explanatory side view of the operation for storing the front passenger seat in the front end zone of the cabin space, in the seat storing structure according to the fourth embodiment.

Differently from the first embodiment, a fourth embodiment of the present invention employs a front passenger seat adapted to be folded and then stored, and a seat storing structure conformable to the front passenger seat. FIGS. 12 and 13 are explanatory top plan and side views of an operation for storing the front passenger seat in the front end zone of the cabin space, in a seat storing structure according to the fourth embodiment of the present invention. In FIGS. 12 and 13, the front passenger seat in a passenger seating position where a passenger can sit thereon is indicated by on-dot chain lines, and the front passenger seat stored in the front end zone of the cabin space is indicated by solid lines.

The front passenger seat 73 includes a seat cushion 73a, a seatback 73b having a lower end pivotally coupled to the rear end of the seat cushion 73a, and a headrest 73c attached to the upper end of the seatback 73b. The headrest 73c of the front passenger seat 73 is detachable from the seatback 73b. Further, the seatback 73b is coupled to the seat cushion 73a through a coupling member 74 so as to be frontwardly inclined and superimposed closely on the seat cushion 73a.

The fourth embodiment includes a front slider 78A and a rear slider 78B which are slidably attached to a slide rail 30. A front connecting member 79A and a rear connecting member 79B are fixed to the back surface of the seat cushion 73a correspondingly to the front slider 78A and the rear slider 78B. The front connecting member 79A is attached to the front slider 78A so as to be rotatable in a given range in a plane orthogonally intersecting to the floor mat 39 and extending in the frontward and rearward directions, i.e. longitudinal direction, of the vehicle. The rear connecting member 79B is detachable from the rear slider 78B.

According to the coupling structure of the seat cushion 73a and the slide rail 30, when the rear connection member 79B is detached from the rear slider 78B and then the rear end of the seat cushion 73a is lifted up, the front connecting member 79A is rotated with respect to the seat cushion 78A and the seat cushion 73a is held in a position where it uprightly stands on the floor mat 39.

In an operation for storing the front passenger seat 73 in the front end zone of the cabin space, the headrest 73c is first detached, and then the seatback 73b is frontwardly inclined and superimposed closely on the seat cushion 73a. Then, the rear end of the seat cushion 73a is lifted up so that the seat cushion 73a and the seatback 73b superposed closely thereon stand on the floor mat 39. With keeping in this folded state (so-called double folded state), the front passenger seat 73 is moved along the slide rail 30 to the front end zone of the cabin space and stored therein.

Figure 14:
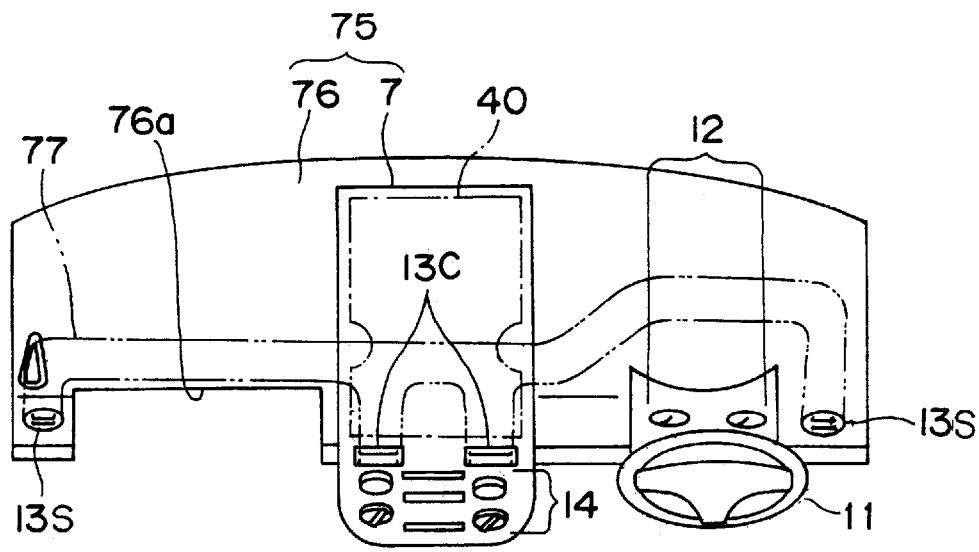
FIG. 14 is a top plan view showing an instrument panel disposed in the front end zone of the cabin space to constitute the seat storing structure according to the fourth embodiment.
Figure 15:
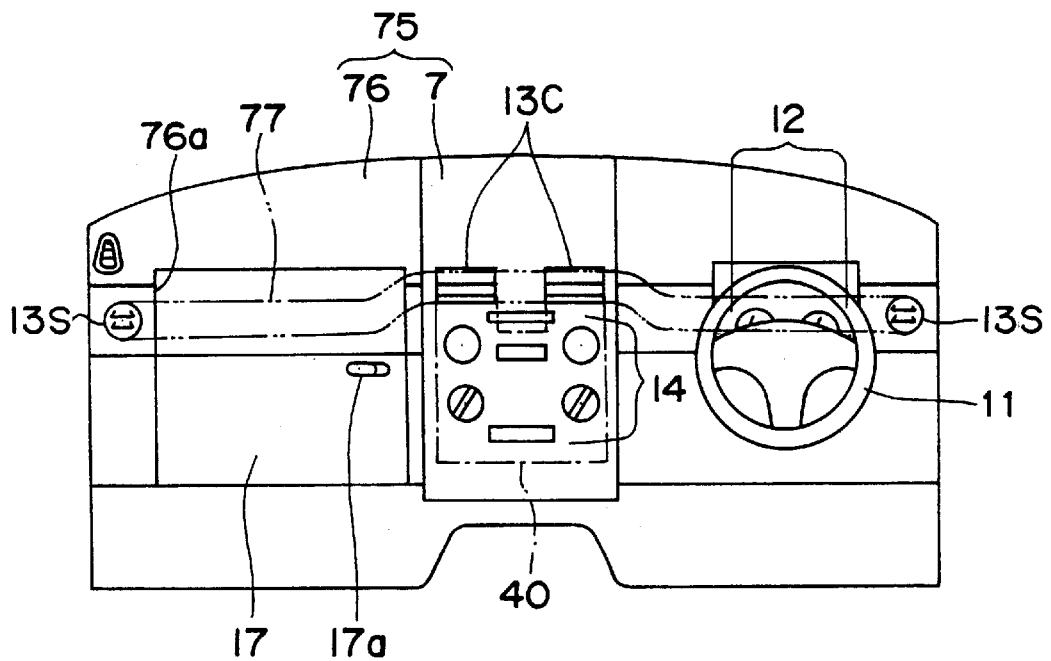
FIG. 15 is a front view showing the instrument panel disposed in the front end zone of the cabin space to constitute the seat storing structure according to the fourth embodiment.

FIGS. 14 and 15 are top plan and front views showing an instrument panel 75 disposed in the front end zone of the cabin space to constitute a seat storing structure conformable to the front passenger seat in the above folded state. An instrument panel body 76 has an outer or cabin-facing surface formed with a concave portion 76a for receiving the front passenger seat 73. In the fourth embodiment, the concave potion 76a is formed in a region of the instrument panel body 76 opposed to the rear surface of the seatback 73b uprightly standing together with the seat cushion 73a. Thus, the seatback 73b moved to the front end zone of the cabin space along the slide rail 30 is received in the concave potion 76a initially from the rear surface of the seatback 73b. The concave potion 76a has a surface in conformity to the outer shape of the seatback 73b to be fitted or received therein. Further, a glove box 17 is provided in the surface (i.e. frontmost bottom wall) of the concave potion 76a opposed to the rear surface of the seatback 73b.

As clearly seen in FIGS. 12 and 13, in the fourth embodiment, a part of the double-folded front passenger seat 73 (a part of the seatback 73b in the fourth embodiment) moved to the front end zone of the cabin space along the slide rail 30 is received in the concave potion 76a. Thus, the front passenger seat 73 can be readily stored in the front end zone of the cabin space without causing any blocking of the view from the driver seat.

As with the first embodiment, in the fourth embodiment, the air-conditioning unit 40 is contained in an inside space zone which is defined by the console 7 constituting the instrument panel 75 and disposed at a position where the inside space zone does not overlap the concave portion 76a in the width direction of the vehicle. This makes it possible to assure not only a sufficient inside space of the instrument panel body 76 opposed to the front passenger seat 73 to allow the concave portion 76a to be protrudingly formed thereby, but also a sufficient cabin space below the instrument panel body 76 to receive the seat cushion 73a therein. In this case, in conjunction with the concave portion 76a, an air-conditioning duct 77 extending through the inside space of the instrument panel in the width direction of the vehicle is curved to detour around the concave portion 76a and extend to the air outlet 13S provided close to one end of the instrument panel body 76.

While the fourth embodiment employs a seat-moving guide mechanism including the slide rails 30 each arranged to have a given oblique angle with respect to the longitudinal direction of the vehicle, the present invention is not limited to this mechanism, but the guide mechanisms according to the second and third embodiments may be used.

Fifth Embodiment

Figure 16:
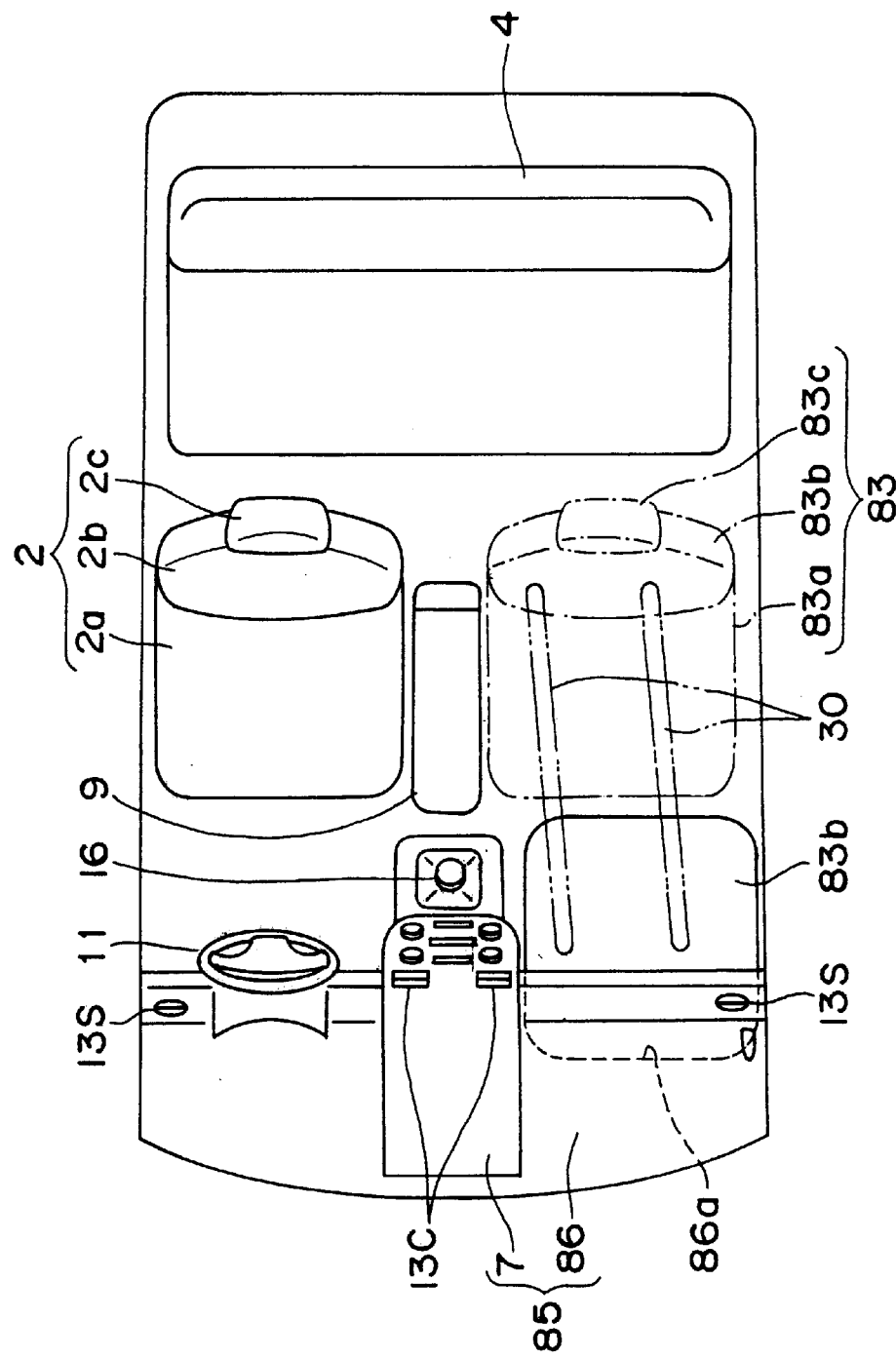
FIG. 16 is an explanatory top plan view of an operation for storing a front passenger seat in the front end zone of the cabin space, in a seat storing structure according to a fifth embodiment.
Figure 17:
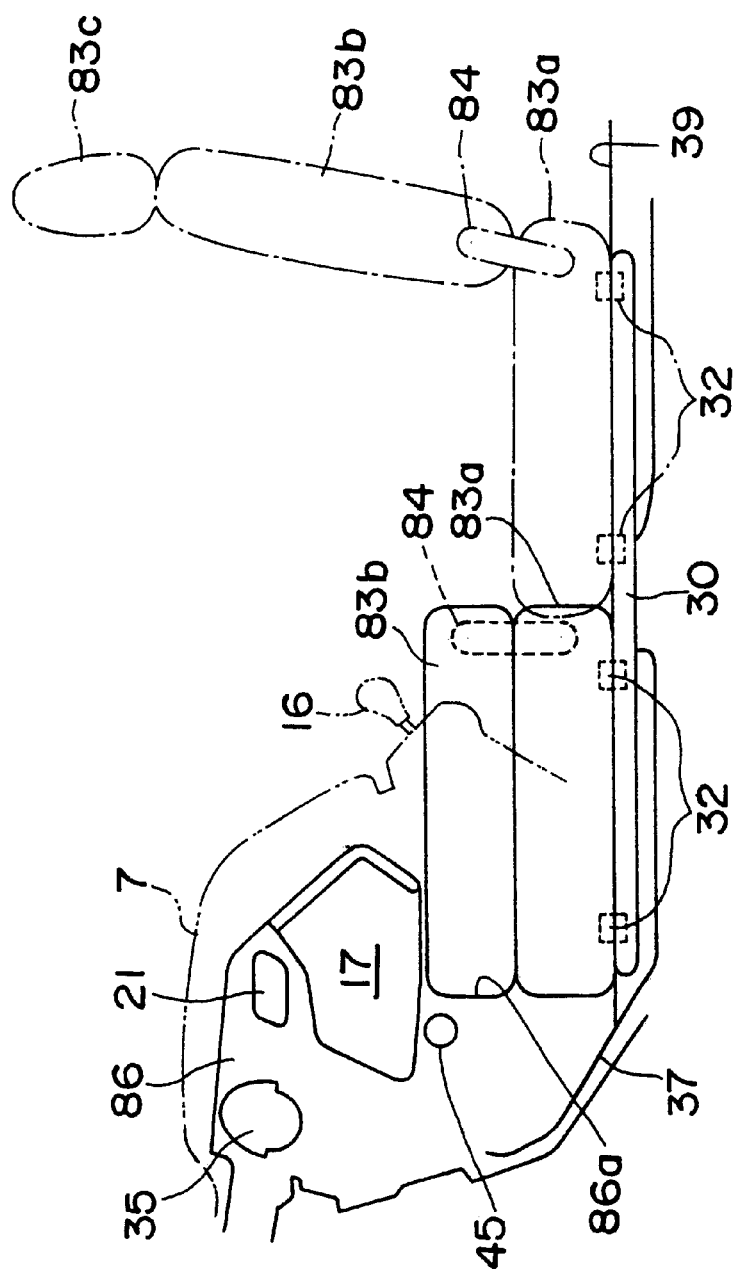
FIG. 17 is an explanatory side view of the operation for storing the front passenger seat in the front end zone of the cabin space, in the seat storing structure according to the fifth embodiment.

In a fifth embodiment of the present invention, a seat storing structure is adapted to store a front passenger seat in the front end zone of the cabin space in a different folded state from that in the fourth embodiment. FIGS. 16 and 17 are top plan and side views showing the seat storing structure according to the fifth embodiment of the present invention, and an operation for storing the front passenger seat in the front end zone of the cabin space. In FIGS. 16 and 17, the front passenger seat 83 in a passenger seating position where a passenger can sit thereon is indicated by one-dot chain lines, and the front passenger seat 83 stored in the front end zone of the cabin space is indicated by solid lines.

The front passenger seat 83 includes a seat cushion 83a, a seatback 83b having a lower end pivotally coupled to the rear end of the seat cushion 83a, and a headrest 83c attached to the upper end of the seatback 83b. The headrest 83c of the front passenger seat 83 is detachable from the seatback 83b. Further, the seatback 83b is coupled to the seat cushion 83a through a coupling member 84 so as to be frontwardly inclined and superimposed closely on the seat cushion 83a. As with the first embodiment, the seat cushion 83a is slidably coupled to the slide rails 30 through the plurality of sliders 32.

In the operation for storing the front passenger seat in the front end zone of the cabin space, the headrest 83c is first detached, and then the seatback 83b is frontwardly inclined and superimposed closely on the seat cushion 73a. With keeping in this folded state, the front passenger seat 83 is moved along the slide rail 30 to the front end zone of the cabin space and stored therein.

An instrument panel body 86 has an outer or cabin-facing surface formed with a concave portion 86a for receiving therein the front passenger seat 83. In the fifth embodiment, the concave portion 86a is formed in a region of the instrument panel body 86 opposed to the front end portions of the seat cushion 3a and the seatback 83b superimposed thereon. The seat cushion 83a and the seatback 83b moved to the front end zone of the cabin space along the slide rail 30 are received in the concave potion 86a initially from the front ends of the seat cushion 83a and the seatback 83b. The concave potion 76a has a surface in conformity to the outer shape of the seat cushion 83a and the seatback 83b to be fitted or received therein. Further, in the fifth embodiment, a glove box 17 is provided above the concave potion 86a to protrude in the longitudinal direction of the vehicle.

In the fifth embodiment, a part of the front passenger seat 83 (a part of the seat cushion 83a and the seatback 83a in the fifth embodiment) moved to the front end zone of the cabin space along the slide rail 30 with superposing the seatback 83a on the seat cushion 83a is received in the concave potion 86a. Thus, the front passenger seat 83 can be readily stored in the front end zone of the cabin space without causing any blocking of the view from the driver seat.

As with the aforementioned embodiments but not specifically shown, in the fifth embodiment, the air-conditioning unit 40 is contained in an inside space zone which is defined by the console 7 constituting the instrument panel 85 and disposed at a position where the inside space zone does not overlap the concave portion 86a in the width direction of the vehicle. This makes it possible to assure not only a sufficient inside space of the instrument panel body 86 opposed to the front passenger seat 83 to allow the concave portion 86a to be protrudingly formed thereby, but also a sufficient cabin space below the instrument panel body 86 to receive the seat cushion 83a and the seatback 83b therein.

While the fifth embodiment employs a seat-moving guide mechanism including the slide rails 30 each arranged to have a given oblique angle with respect to the longitudinal direction of the vehicle, the present invention is not limited to this mechanism, but the guide mechanisms according to the second and third embodiments may be used.

It is to be understood that the present invention is not limited to the illustrated embodiments, but various modifications and design changes can be made without departing from the spirit and scope of the present invention.

What is claimed is:

1. A vehicle-seat storing structure having in combination an instrument panel disposed in the front end zone of a cabin space of a vehicle along the width direction of the vehicle, and a seat disposed opposed to said instrument panel, wherein said seat comprises a seat cushion supported approximately horizontally and adapted to be slidably moved in the frontward and rearward directions of the vehicle, a seatback having a lower end pivotally coupled to the rear end of said seat cushion so as to be frontwardly inclined toward said seat cushion, and a headrest provided at the upper end of said seatback, and said instrument panel has a concave portion on the opposed side to said seat, said concave portion being adapted to receive therein at least a part of said seatback or said headrest in a seat position where said seat cushion is slidingly moved to a given position in the front end zone of the cabin space and said seatback is inclined frontwardly by a given angle.

2. The vehicle-seat storing structure as defined in claim 1, wherein said instrument panel defines an inside space having a given zone containing an air-conditioning unit for controllably adjusting cabin air and outside air to provide a desired cabin-air condition, said given zone being located approximately centrally in the width direction of the vehicle, and said concave portion is formed in a region of said instrument panel where said concave portion does not overlap said air-conditioning unit in the width direction of the vehicle.

3. The vehicle-seat storing structure as defined in claim 2, wherein said instrument panel is further provided with an air outlet for discharging a conditioned air prepared by said air-conditioning unit into the cabin space, and the inside space of said instrument panel contains an air-conditioning duct for providing fluid communication between said air-conditioning unit and said air outlet to deliver the conditioned air, wherein said air-conditioning duct is formed to detour around said concave portion without causing interference therewith.

4. The vehicle-seat storing structure as defined in claim 3, wherein said instrument panel defines therebelow a space for receiving therein said seat cushion in said seat position where said seat is stored in connection with said instrument panel.

5. The vehicle-seat storing structure as defined in claim 4, wherein said concave portion is formed such that a cabin-facing surface of said part of said seatback or said headrest received in said concave portion becomes approximately flush with the surface of said instrument panel around said cabin-facing surface, in said seat position where said seat is stored in connection with said instrument panel.

6. The vehicle-seat storing structure as defined in claim 5, wherein said concave portion has a surface formed in conformity to the peripheral surface of said part of said seatback or said headrest to be received in said concave portion.

7. The vehicle-seat storing structure as defined in claim 6, wherein said seat is a front passenger seat disposed in parallel with a driver seat on the front side of the cabin space, wherein a rear passenger seat is provided behind said front passenger seat.

* * * * *

UNITED STATES PATENT AND TRADEMARK OFFICE
CERTIFICATE OF CORRECTION

PATENT NO. : 6,698,813 B2
DATED : March 2, 2004
INVENTOR(S) : Kenji Nonaka et al.

It is certified that error appears in the above-identified patent and that said Letters Patent is hereby corrected as shown below:

<u>Title page,</u>
Item [56], References Cited, U.S. PATENT DOCUMENTS, insert
-- 1,640,640 A  8/1927   Bourgon --.

Signed and Sealed this

Tenth Day of August, 2004

JON W. DUDAS
*Acting Director of the United States Patent and Trademark Office*